Figure 4:
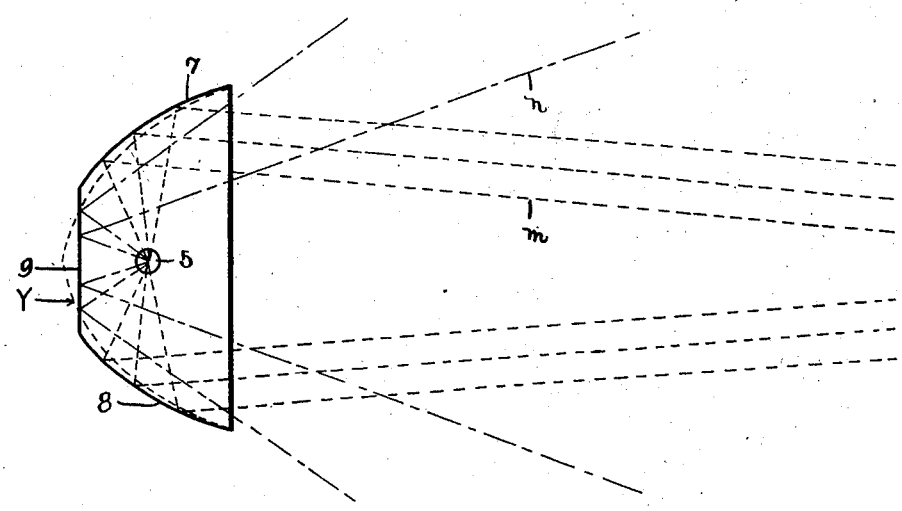

Oct. 20, 1925.
W. F. MORRISON
REFLECTOR FOR LIGHT PROJECTORS
Filed Aug. 27, 1924
1,558,270
2 Sheets-Sheet 1
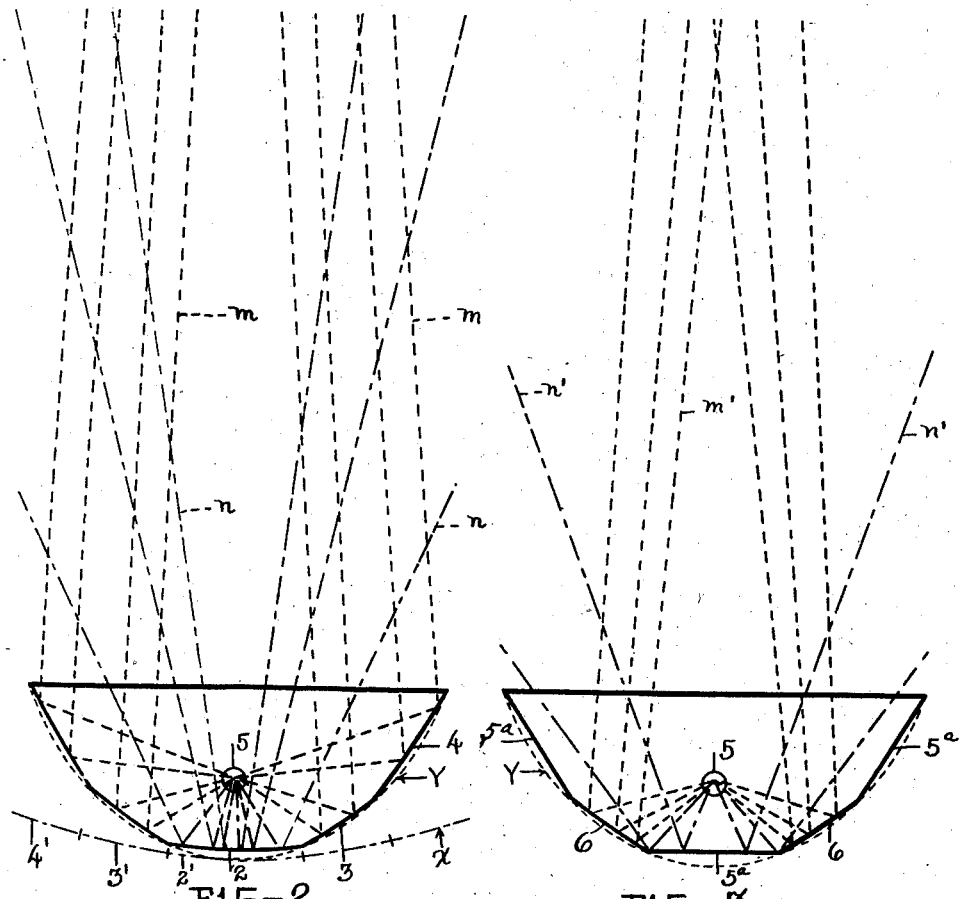

Inventor
WALTER F. MORRISON,
BY Warner J. Cutterley.
Attorney

Patented Oct. 20, 1925.

1,558,270

UNITED STATES PATENT OFFICE.

WALTER F. MORRISON, OF LOS ANGELES, CALIFORNIA.

REFLECTOR FOR LIGHT PROJECTORS.

Application filed August 27, 1924. Serial No. 734,440.

*To all whom it may concern:*

Be it known that I, WALTER F. MORRISON, a citizen of the United States, residing at Los Angeles, in the county of Los Angeles and State of California, have invented new and useful Improvements in Reflectors for Light Projectors, of which the following is a specification.

My invention has reference, in its broad aspect, to improvements in light reflectors of the type exemplified by a division of the reflector into a series or reflecting zones designed to distribute the projected light rays over a uniform predetermined area of modified intensity extending laterally in all directions from an area of high intensity, which, as applied to motor vehicles would be the road bed at a certain distance in advance of the vehicle. More particularly it is my purpose to provide a light reflector wherein certain or all of the reflecting zones are formed each with a cross sectional or lateral curvature contemplating a segment of a given parabola, and these zones may be, and preferably are in some instances, separated by zones having plane or flat reflecting surfaces. The alternate arrangement of flat and curved reflecting zones is designed to uniquely combine the maximum distribution of reflected rays induced by a plane or flat surface with the greater concentration of such reflected rays as attributable to curved surfaces. Furthermore, my invention includes the arrangement of these reflecting zones with their major axes parallel with a vertical line passing through the focal point of the reflector.

In the principal embodiment of my invention the respective reflecting zones are developed from segments of a parabola more shallow, or of less lineal curvature, than the parabola contemplated by the cross section of the reflector, and these zones may be, and preferably are, separated by zones having a cross sectional or lateral plane or flat surface. It will be apparent then that my reflector avoids the disadvantages attributable to reflectors having all plane or flat reflecting zones, and also the disadvantages of those reflectors wherein corrugations are designed to produce more effective illumination. Furthermore, my reflector attains a more uniform distribution of light in the areas of low intensity and a greater concentration in the area of high intensity than can be expected from reflectors of the type exemplified by similarly and arcuately curved zones or zones contemplating the developement of a conic section.

Among the many advantages, in addition to those recited above, which may be attributed to reflectors constructed according to the principles of my invention are; first, high rays are eliminated thereby avoiding dazzling the eyes of a person approaching the light; second, the greatest intensity normally exists in the approximate center of a band of modified light thereby particularly adapting my reflector for use on motor vehicles; third, most effective illumination is obtained without resorting to wedge shaped or other peculiarly formed reflecting zones, and; fourth, by modifying the type of parabola contemplated by the segments of my reflecting zones certain changes may be affected in the illuminated field to adapt the reflector to a variety of uses and these can be attained without materially changing the form and general makeup of the reflector or of the die or post utilized in its fabrication.

The structural elements employed to accomplish the above and other results and objects will be hereinafter more fully described in detail and specifically pointed out in the claim appended hereunto and forming a part of this specification, but the scope of my invention may only be determined by the limits defined in the claim.

In the accompanying drawings, wherein is illustrated the preferred embodiment of my invention;—

Figure 1 is a view suggestive of the band of light in the area of high intensity thrown by my reflector, Figure 2 is a diagrammatic view of the principal embodiment of my reflector wherein the reflecting zones each contemplate in cross section segments of the parabola indicated by the dot-and-dash line, Figure 3 is a diagrammatic view of a reflector alternating plane or flat zones in cross section with those contemplating segments of a parabola.

Figure 5:
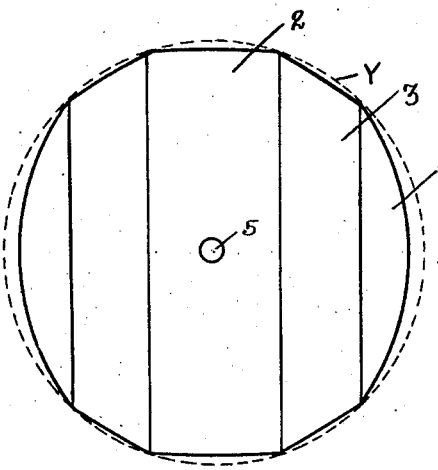
Figure 6:
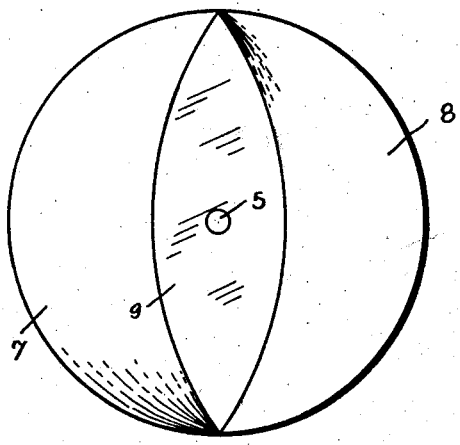

Figure 4 is a diagrammatic view of a form of my reflector wherein but two curved zones are employed and these are separated by a centrally located plane or flat reflecting surface in cross section, Figure 5 is a diagrammatic front view of the reflector shown in Figure 1, and Figure 6 is a diagrammatic front view of the reflector shown in Figure 4.

Like characters of reference refer to like or similar parts throughout the several views of the drawings.

It may be assumed that one of the most effective forms of illumination for motor vehicles is a light reflector adapted to project rays in a band in advance of the vehicle with the highest intensity upon and slightly above the road bed, but not high enough to dazzle the eyes of the driver of another vehicle approaching the light. Furthermore an area of modified illumination should exist on either side of the road bed for the reason that a vehicle driver's eyes become non-receptive through concentration upon the area of intense illumination. It is with a view to attaining these ends in the simplest and most effective manner that the present invention is designed.

As has been heretofore indicated generally, the principal embodiment of my invention resides in the provision of a parabolic reflector (1) made up of adjacent vertically arranged zones (2), (3) and (4). As illustrated diagrammatically in Figure 2, these zones are curved in cross section to conform to segments (2′) (3′) and (4′) of a parabola X of a less degree of curvature, that is more shallow, than the parabola contemplated by the reflector and indicated by dotted lines at Y. The source of light is indicated at (5) and it may be assumed that it is disposed at the focal point of the reflector. Inasmuch as the degree or extent of distribution of reflected light rays varies inversely to the degree of curvature of the reflecting surface with a plane or flat reflecting surface as inducing a maximum of distribution and a true arc as inducing a maximum of concentration, it will be seen that the rays of light forming the area of greatest intensity will emanate from zones (3) and (4) as indicated approximately by dotted lines m while the rays of light forming the area of modified intensity will emanate from zone (2) as indicated by the dot-and-dash lines n. By simply modifying the type of parabola X the area of illumination as well as the relative intensities in the area may be changed, and the nature of the reflecting surface developed according to my invention induces a more accurate and effective approximation of the preferred form of illumination for motor vehicles than is attainable by all plane or flat zones or zones contemplating in cross section a true arc of a circle or conic section. It may be stated here, that in forming my reflector a parabola post or die is turned up and machined to form the required zones, or if flat zones are desired between sections of the parabola, such flat portions may be readily formed on the die. The reflector is then pressed upon the die. Should the die become worn or otherwise inapt to form a given type of my reflector it may be readily machined down to form a reflector having slightly different reflecting zones.

The area of modified intensity may be increased by utilizing zones having a proportionately less degree of curvature, that is zones contemplating segments of a more shallow parabola. Furthermore, where requirements specify the utilization of a light field, the upper portion or half of which is of less breadth than the lower portion or half, the segments may be formed according to the concept of my invention, with a parabolic curvature of shorter focal length in the upper portion or half, than in the lower portion or half causing greater concentration of the light rays reflected from the upper portion of the reflecting field. In this instance the respective curvatures of the segments are merged gradually so that there is no marked dividing point between the upper and lower portions thereof.

Where it is desired particularly to increase the area of modified intensity by utilizing zones having a proportionately less degree of curvature, that is zones contemplating segments of a more shallow parabola as above mentioned, I have conceived of a reflector formed after the diagram shown in Figure 3. Here zones having a reflecting surface approximating in cross section a plane or flat surface are interposed between the zones having curved reflecting surfaces. The flat zones are designated (5ª) and the curved zones (6). It will be noted that the light rays n′ projected from the flat zone (5ª) affect a more extensive area of modified illumination than the corresponding rays of Figure 2.

The form of my invention shown in Figure 4 contemplates a reflector in the nature of a true parabola but divided vertically into two or more zones (7) and (8) between which is interposed one or more zones (9) having a flat or plane reflecting surface in cross section. The relative position of zones (7) and (8) may be readily changed to vary the pattern of light projected, but such changes necessitate a corresponding modification of (9).

While in the foregoing, there have been illustrated and described such combination and arrangement of elements as constitute the preferred embodiments of my invention, it is nevertheless desired to emphasize the fact that interpretation of my invention should only be conclusive when made in the light of the subjoined claim.

Having described my invention and its objects with such attention to detail as will thoroughly acquaint one skilled in the art with its construction and advantages, I claim:—

A segmental parabolic reflector for light projectors comprising a plurality of vertically arranged contiguous zones, the common bounding edges of which are relatively parallel in a vertical plane and of the same relative parabolic curvature, said zones having a lateral parabolic curvature taken at right angles to the bounding edges and at any point in their lengths of greater focal length than the focal length of the parabola contemplated by the curvature of said edges, and the focal length of the parabola contemplated by the curvature of said edges being the same as the focal length of the reflector.

In testimony whereof I affix my signature hereunto.

WALTER F. MORRISON.